United States Patent
Rombach et al.

(10) Patent No.: US 9,664,704 B2
(45) Date of Patent: May 30, 2017

(54) DRIVE AND COMPENSATION CIRCUIT FOR CAPACITIVE MEMS STRUCTURES

(71) Applicant: Albert-Ludwigs-Universitat Freiburg, Freiburg (DE)

(72) Inventors: Stefan Rombach, Merdingen (DE); Maximilian Marx, Freiburg (DE); Yiannos Manoli, Freiburg (DE)

(73) Assignee: Albert-Ludwigs-Universitat Freiburg, Freiburg (DE)

( * ) Notice: Subject to any disclaimer, the term of this patent is extended or adjusted under 35 U.S.C. 154(b) by 176 days.

(21) Appl. No.: 14/730,659

(22) Filed: Jun. 4, 2015

(65) Prior Publication Data

US 2015/0268262 A1 Sep. 24, 2015

Related U.S. Application Data

(63) Continuation of application No. PCT/EP2013/075498, filed on Dec. 4, 2013.

(30) Foreign Application Priority Data

Dec. 4, 2012 (DE) .................. 10 2012 222 225

(51) Int. Cl.
  *G01P 1/04* (2006.01)
  *G01C 19/5726* (2012.01)
  *G01P 3/22* (2006.01)
(52) U.S. Cl.
  CPC ............ *G01P 1/04* (2013.01); *G01C 19/5726* (2013.01); *G01P 3/22* (2013.01)

(58) Field of Classification Search
  CPC ......................................................... G01P 1/04
  See application file for complete search history.

(56) References Cited

U.S. PATENT DOCUMENTS 6,300,820 B1  10/2001 Fotouhi et al.
6,445,195 B1   9/2002 Ward
(Continued)

OTHER PUBLICATIONS

International Search Report, International Application No. PCT/EP2013/075498, dated Mar. 4, 2014, 4 pages.
(Continued)

*Primary Examiner* — Clayton E Laballe
*Assistant Examiner* — Dennis Hancock
(74) *Attorney, Agent, or Firm* — Barley Snyder

(57) ABSTRACT

A circuit for activating a capacitive MEMS structure is provided, with the capacitive MEMS structure having an oscillator element and an electrostatic excitation unit with a first input connection and a second input connection. The circuit includes a high voltage generator, a first pump capacitor, a second pump capacitor, a control unit, and a low voltage operation amplifier. The high voltage generator generates a high voltage and connects to the first input connection and the second input connection. The first pump capacitor is connected to the high voltage generator and includes a first connection connected to the first input connection. The second pump capacitor connects to the high voltage generator and includes a first connection connected to the second input connection. The control unit connects to a second connection of the first pump capacitor and a second connection of the second pump capacitor. The low voltage operation amplifier connects to the control unit.

11 Claims, 3 Drawing Sheets

(56) References Cited

U.S. PATENT DOCUMENTS

| | | |
|---|---|---|
| 2009/0309613 A1 | 12/2009 | Hollocher et al. |
| 2010/0307243 A1 | 12/2010 | Prandi et al. |
| 2011/0146402 A1 | 6/2011 | Donadel et al. |
| 2011/0197675 A1 | 8/2011 | Caminada et al. |
| 2012/0268096 A1* | 10/2012 | Kawasoe ............. G09G 3/3696 323/288 |
| 2013/0207717 A1* | 8/2013 | Matsuoka ................. G05F 1/10 327/536 |

OTHER PUBLICATIONS

German Office Action, Application No. 10 2012 222 225.1, dated Jul. 31, 2013, 12 pages.

\* cited by examiner

DRIVE AND COMPENSATION CIRCUIT FOR CAPACITIVE MEMS STRUCTURES

CROSS-REFERENCE TO RELATED APPLICATIONS

This application is a continuation of PCT International Application No. PCT/EP2013/075498 filed Dec. 4, 2013, which claims priority under 35 U.S.C. §119 to German Application No. 10 2012 222 225.1, filed Dec. 4, 2012.

FIELD OF THE INVENTION

The present invention relates to a circuit and, more particularly to a circuit for controlling a capacitive MEMS structure having at an oscillator element and an electrostatic excitation unit having at least one first input connection and one second input connection.

BACKGROUND

Capacitive structures are used in MEM systems (micro electromechanical systems) to drive micro-mirrors, micro-structured circuits and sensors by means of electrostatic force.

A typical example for a sensor that uses capacitive structures both for compensation of forces as well as for actuation is the angular rate sensor. Known angular rate sensors are used in driver assistance systems, driving safety systems such as an electronic stability program, navigation systems and increasingly also in mobile devices such as mobile phones, tablet computers and game consoles. These known angular rate sensors thereby detect angular rates around a defined axis based on the coriolis effect.

Known angular rate sensors generally include, for example, two masses, including a primary and a secondary mass. To be able to detect an angular rate by means of the coriolis effect, the total mass has to be set in motion. The primary mass, in which the secondary mass is suspended, is oscillated constantly through electrostatic actuation with a constant frequency.

Through a rotation of the sensor around its sensitive axis, the secondary mass is deflected orthogonally to the primary axis in accordance with the following equation:

Equation (1):

$$\vec{F}_c = -2 \cdot m \cdot \vec{\Omega} \times \vec{v}_p \quad (1)$$

Thereby, Fe is the coriolis force, m the mass, $\Omega$ the angular rate and vp the speed of the primary mass.

The secondary mass is thereby mechanically suspended in a way that it can only deflect orthogonally to the primary oscillation. To achieve a high linearity, large bandwidths and a reduced sensitivity in relation to process variations, these sensors are operated in a fed-back way.

Thereby, the effective coriolis force Fc is compensated by the application of a resetting capacitive force Fes to the secondary mass according to the following equation:

Equation (2):

$$\vec{F}_c = \vec{F}_{es} \quad (2)$$

The application of this compensation signal, that counteracts the input variable, is called force feedback.

Hence, the secondary mass remains in the resting position and the generated capacitive force Fes is a direct measure for the angular rate that impacts on the system. To generate forces that are sufficiently high for the activation of the primary and the secondary mass, it is necessary to use electric voltages that are multiple times higher than typical supply voltages of integrated circuits. In addition, these high voltages are used to adjust the spring constant and, therefore, the resonance frequency of the secondary mass.

There is an attractive electrostatic force between two or several electrical electrodes with opposite charges (capacitance). This force can be quantitatively determined based on the change of the energy E stored in the capacitance with the distance between the electrodes x.

In case of parallel electrodes as they are used on the secondary side of angular rate sensors, the force Fes,p is calculated according to equation (3).

Equation (3):

$$\vec{F}_{es,p} = \frac{dE}{dx} = -\frac{1}{2} \frac{\varepsilon_0 \varepsilon_r A}{x^2} V^2 \quad (3)$$

Thereby, $\varepsilon r$ is the relative permittivity, $\varepsilon o$ the dielectric constant and V the voltage between the electrodes. A is the electrode surface (see FIG. 1a).

For the primary side, comb actuators are typically used in angular rate sensors in whose case the force Fes,k is calculated according to equation (4).

Equation (4):

In equation (4), N is the number of combs, d the constant distance between the electrodes and h the horizontal expansion of the electrodes. Both electrode configurations are shown in FIG. 1.

$$\vec{F}_{es,k} = \frac{dE}{dx} = -N \frac{\varepsilon_0 \varepsilon_r h}{d} V^2 \quad (4)$$

The force Fes,p generated by parallel electrodes is, in contrast to the force Fes,k, dependent on comb actuators with the distance x. As, however, the movement of the mass is compensated in the case of the secondary side, this dependency can be neglected. In both cases (FIG. 1a and FIG. 1b), the force is a quadratic function of the voltage.

Since electrostatic forces always have an attractive effect, the primary mass is driven differentially in the case of angular rate sensors and the movement of the secondary mass is also compensated differentially. As shown in FIG. 2, the mass and therefore also the counter-electrodes of the capacitances CFB1,2 are set on a fixed potential V0 for this purpose.

A voltage with a fixed direct voltage part VDC and a variable voltage part VAC(t) is applied to the second electrode with the capacitances CFB1,2. Thereby, the voltage VAC(t) is generally a rectangular voltage with a phase shifted by 180 degrees between CFB1 and CFB2. This results, according to the following equation (5), in the overall force Fes, tot that impacts on the mass and that is linearly dependent on the voltages VDC and VAC(t).

Equation (5):

$$\vec{F}_{es,tot} = F_{es1} - F_{es2} = -2 \frac{C_{FB1,2}}{x} V_{AC}(t)(V_{DC} - V_0) \quad (5)$$

The required electrostatic force can on one hand be generated by means of a high voltage generator and high voltage amplifiers.

The voltages VDC and VAC(t) required for the generation of electrostatic capacitive forces according to equation (5), shown in FIG. 3, are usually applied to the capacitive structures of the sensor by means of operation amplifiers. Such a circuit system is described in greater detail for example in the article by Lasse Alltonen, Mikko Saukoski, Kari Halonen: "On-chip Digitally Tunable High Voltage Generator for Electrostatic Control of Micromechanical Devices", IEEE 2006 Custom Integrated Circuits Conference (CICC), p. 583-586, and is also an object of the WO 2007/015218 A1.

The maximum output voltage of the operation amplifiers is limited by their supply voltage. To generate sufficiently high forces, it is therefore generally necessary to use high voltage operation amplifiers (HV-OPV) that work with voltages above the chip supply voltage VDD. For this reason, a high voltage generator generates a significantly higher voltage VDD_HV out of the voltage VDD and provides this voltage to the HV-OPV as a supply voltage. Thereby, the high voltage generator has to provide both the static current for the operation of the HV-OPV and the dynamic current to charge and/or discharge the capacitances CFB1 and CFB2 during the switching processes of the voltage VAC(t). The control units, that are provided with low voltage, supply the signal to be amplified by the HV-OPV with a factor k based on a clock with the desired amplitude VAC/k and the DC voltage VDC/k. Through the operation of the HV-OPV in feedback mode, the voltages VDC and VAC(t) can be accurately set.

Furthermore, the electrostatic force can also be generated by means of a high voltage generator in direct connection to capacitive structures for the actuation as known, for example, from the WO 2012/10541 A1.

This known solution for the generation of defined high voltages on capacitive structures is shown in FIG. 4. Thereby, no HV-OPV is used and the controlled input voltage of the high voltage generator VDD_HV is applied directly to the capacitances CFB1 and CFB2. The high voltage generator is readjusted through an analog control signal from a control unit (e.g. digital to analog convertor). In spite of this readjustment possibility, the high voltage VDD_HV in the static state is a static voltage VDC in this case. This is useful in the application described for the WO 2012/130541 A1, e.g. as no varying voltages VAC(t) are required for the squaring compensation of angular rate sensors.

The known solutions have significant disadvantages though. In case of the circuit according to FIG. 3, they consist on one hand of the enormous power demand of the HV-OPV and on the other hand of the stringent requirements and the power demand of the high voltage generator. The generation of the voltage VDD_HV by the high voltage generator is always prone to losses. In addition, this voltage must in most cases exceed the maximum applicable input voltage of the amplifiers due to the HV-OPV architecture. Moreover, the high dynamic currents during switching of the voltage VAC(t) at the capacitances complicate the constant control of the high voltage VDD_HV.

The standby current of the HV-OPV in case of the frequently used class A amplifiers is dependent on the steepness of the edges and the capacitances $C_{FB1,2}$ to be driven. As a high edge steepness is needed for the angular rate sensors, and as there are even greater parasitic capacitances parallel to the capacitances $C_{FB1,2}$, the standby current is considerable in the described system. Apart from that, the power demand of the HV-OPV increases linearly with the supply voltage $V_{DD\_HV}$ and hence the circuit claims a substantial share of the overall power demand of the sensor reading system for the generation of power.

In case of the known circuit according to FIG. 4, a significant disadvantage consists in the fact that only static voltages $V_{DC}$ can be generated. To drive the primary mass and the compensation of the movement of the secondary mass, however, temporally varying voltages $V_{AC}(t)$ are essential. In order to still transfer such a signal $V_{AC}(t)$ to the high voltage range with the configuration from FIG. 4, the digital control signal would have to be temporally varied and the high voltage generator would have to track the voltage $V_{DD\_HV}$ fast enough. This comes with stringent requirements for the dynamics of the high voltage generator and hence an increased power consumption. In addition, it is only possible to raise the voltage actively in case of a variety of high voltage generators. The reduction of the voltage, in turn, mostly occurs passively through the load current of the application. This condition further increases the complexity of the high voltage generation circuit.

In addition, the high voltage generators used are usually switching power supply devices where a ripple is always superimposed on its voltage as a function of the switching frequency. For high-resolution angular rate sensors, this ripple has to be kept very low in order to prevent additional interference signals from being coupled in the system. In case the high voltage generator and the sensor are directly connected, this is generally only possible through the application of very high switching frequencies. This entails a further increase of the power demand of such systems.

SUMMARY

A circuit for activating a capacitive MEMS structure is provided, with the capacitive MEMS structure having an oscillator element and an electrostatic excitation unit with a first input connection and a second input connection The circuit includes a high voltage generator, a first pump capacitor, a second pump capacitor, a control unit, and a low voltage operation amplifier. The high voltage generator generates a high voltage and connects to the first input connection and the second input connection. The first pump capacitor is connected to the high voltage generator and includes a first connection connected to the first input connection. The second pump capacitor connects to the high voltage generator and includes a first connection connected to the second input connection. The control unit connects to a second connection of the first pump capacitor and a second connection of the second pump capacitor. The low voltage operation amplifier connects to the control unit.

BRIEF DESCRIPTION OF THE DRAWINGS

In the following, the present invention is explained in greater detail on the basis of the preferred design variants illustrated in the attached drawings. Similar or corresponding details of the object according to the invention are marked with the same reference signs. Furthermore, individual characteristics or combinations of characteristics in isolation can also represent independent inventive or invention-based solutions. The figures show.

DETAILED DESCRIPTION OF THE EMBODIMENT(S)

Figure 5:
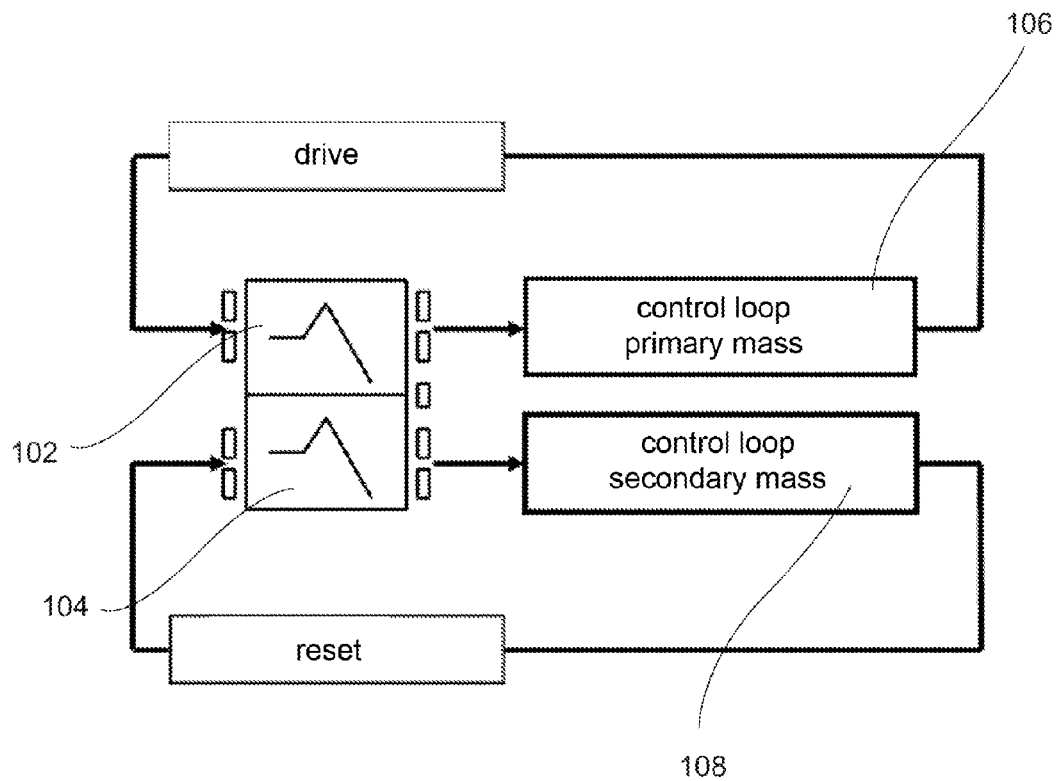
FIG. 5 a schematic display of an angular rate sensor system according to the invention that is based on the coriolis effect.

The present invention is described in greater detail with reference to the figures. FIG. 5 shows a schematic display of a coriolis sensor that includes a control loop for the primary mass 102 and a control loop to reset the secondary mass 104 (the primary and the secondary mass 102, 104 are symbolized by their band-pass behavior in this document). An activation circuit according to the present invention can be used both for the control loop 106 of the primary mass as well as for the control loop 108 of the secondary mass to activate and/or reset the oscillating masses 102, 104. Further, the special control circuit system of the coriolis sensor can be designed, for example, as described in an article by Northemann, T. et al.: "Drive and Sense Interface for Gyroscopes based on Bandpass Sigma-Delta Modulators", Proceedings of 2010 IEEE International Symposium on Circuits and Systems (ISCAS), May 30, 2010-Jun. 2, 2010, 3264-3267.

Although only the application environment of a coriolis sensor is described in the following, the field of application is not limited to angular rate sensors. In addition, the invention is also used in the reliable and low-power operation of further capacitive electrostatic MEM actuators such as micro-mirrors, acceleration sensors and micro-structured switches.

As displayed in FIG. 5, a closed control loop, which respectively contains a circuit for the generation of capacitive electrostatic force, is used according to the present invention for the assessment and drive circuit as a structural concept. Thereby, the drive of the mechanical structure as well as the compensation of an emerging angular rate signal can be implemented in a very energy-efficient manner by means of the invention.

Figure 6:
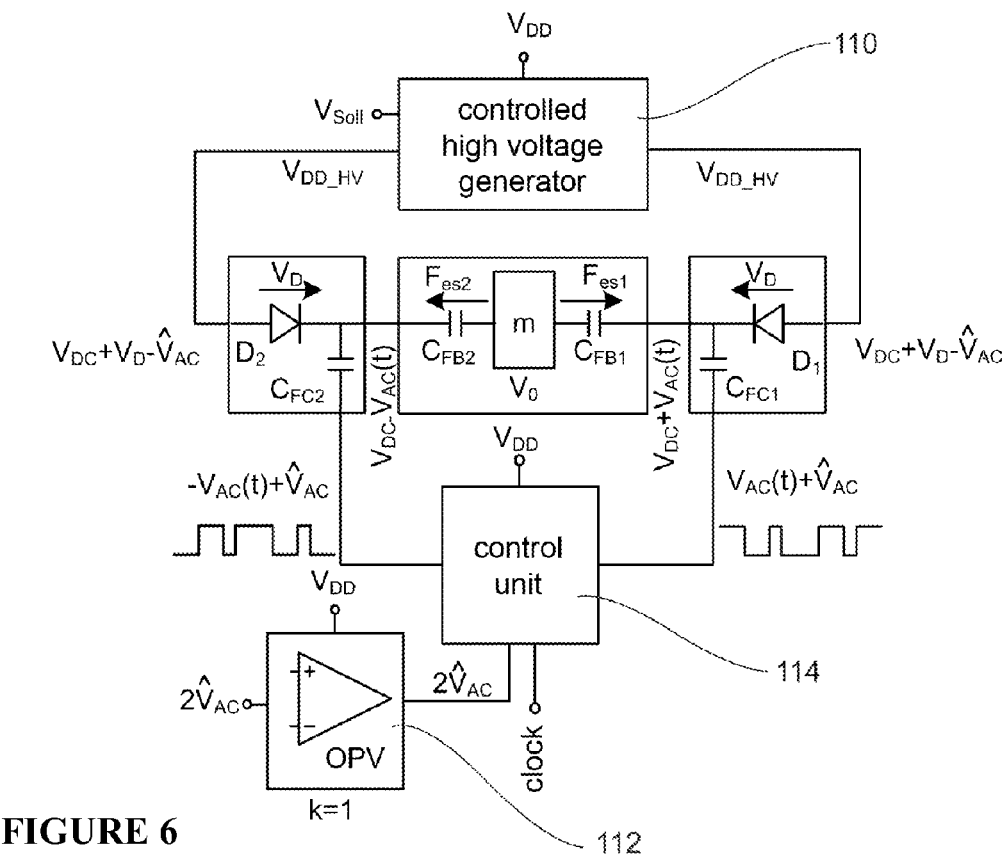
FIG. 6 is a schematic diagram of a circuit according to the invention that activates capacitive actuators by means of a high voltage generator, a low voltage operation amplifier and two pump capacitors.

To create the voltages $V_{AC}$ and $V_{AC}(t)$ with minimal energy input for the generation of the electrostatic forces $F_{es1,2}$, one side (the positively charged electrode) of the pump capacitors $C_{FC1}$, $C_{FC2}$ and the differential drive capacitances $C_{FB1}$, $C_{FB2}$ is respectively charged, as shown in FIG. 6, to the direct voltage $V_{DC}$-$\hat{V}_{AC}$ by means of an accurately controlled low-noise high voltage generator 110.

By means of an operation amplifier (OPV) 112 supplied with low voltage $V_{DD}$ and a control unit 114, the voltage $\hat{V}_{AC} \pm V_{AC}(t)$ is applied to the negative electrode of the pump capacitors $C_{FC1}$. Hence, the capacitances $C_{FC1}$, $C_{FC2}$ are operated as pump capacitors. This entails a charge exchange between the pump capacitors $C_{FC1}$, $C_{FC2}$ and the differential drive capacitances $C_{FB1}$, $C_{FB2}$ monitored by the control unit 114.

For $C_{FC1} \gg C_{FB1}$ and $C_{FC2} \gg C_{FB2}$ at the positive electrodes of the pump capacitors $C_{FC1}$, $C_{FC2}$ and the differential drive capacitances $C_{FB1}$, $C_{FB2}$, there will be the approximate voltage $V_{DC} \pm V_{AC}$ (t) and the force $F_{es,tot}$ according to equation (5):

Equation (5):

$$\vec{F}_{es,tot} = F_{es1} - F_{es2} = -2\frac{C_{FB1,2}}{x} V_{AC}(t)(V_{DC} - V_0) \tag{5}$$

Still, two diodes $D_1$, $D_2$ are to be installed as a reflux blocking device and to form a low-pass filter for the output voltage of the high voltage generator $V_{DD\_HV}$ together with the capacitances $C_{FC1,2}$. The diodes $D_1$, $D_2$ are connected with their respective anode connection to the high voltage generator 110 and with their respective cathode connection to one of the pump capacitors $C_{FC1}$, $C_{FC2}$. Alternatively, transistors can be used at this point.

The idea on which the present invention is based is the use of a low voltage operation amplifier 112 in combination with pump capacitors $C_{FC1}$, $C_{FC2}$ to generate accurately defined high voltage signals for the exact generation of capacitive electrostatic forces. Under ideal conditions and for small movements of the mass m, the applied high voltage generator 110 has to charge the pump capacitors $C_{FC1}$, $C_{FC2}$ and the differential drive capacitances $C_{FB1}$, $C_{FB2}$ only once to a defined potential and will not be stressed again afterwards.

In particular, the high voltage generator 110 in the circuit according to FIG. 6 does not have to supply the dynamic current to charge and/or discharge the drive capacitances $C_{FB1}$ and $C_{FB2}$ during the switching processes of the voltage $V_{AC}(t)$ anymore. Therefore, the required power in the steady state is extremely low.

As the diodes $D_1$ and $D_2$ form a low-pass filter with the pump capacitors $C_{FC1}$, $C_{FC2}$, the requirement for the ripple of the output voltage and hence also for the clock frequency of the high voltage generator is reduced and the power consumption can be lowered even further. In addition, the power demand of the operation amplifier 112 decreases significantly through the operation with a low voltage compared to the variant with two high voltage operation amplifiers.

The present invention is therefore based on the idea of providing the required high direct voltage and the alternating part required for the control process by means of separated components for the generation of the electrostatic forces at a differential capacitor, so that the high voltage generator under ideal conditions will only need to recharge the capacitances of the differential capacitor and the pump capacitors during the run-up phase to a defined potential and will no longer be stressed during permanent operation. In particular, the dynamic current to charge and/or discharge the capacitances of the differential capacitors during the switching processes of the oscillation during permanent operation is not supplied by the high voltage generator. Of course, parasitic effects and losses will occur under real conditions.

According to the present invention, a circuit to control a capacitive MEMS structure (micro electro mechanical system structure; in German-speaking countries also called MST structure, "Mikrosystemtechnik-Struktur") with at least one oscillator element, that can be excited to perform an oscillating movement, and an electrostatic excitation unit having at least a first and a second input connection is indicated. The circuit has a high voltage generator to generate a high voltage out of a supply voltage, whereby the high voltage generator can be connected with the two input connections, and at least a first and a second pump capacitor to charge the electrostatic excitation unit, whereby a first connection of the first pump capacitor is connected to the high voltage generator and can be connected with the first input connection and a first connection of the second pump capacitor is connected with the high voltage generator and can be connected to the second input connection.

A control unit is connected to second connections of each pump capacitor to impart an alternating signal, and there is at least one low voltage operation amplifier to be installed, which is connected to the control unit and superimposed on the alternating signal to generate an adjustment component. The adjustment component is generated, for example, as a function of a current position of the oscillator element or of another suitable adjustment variable. Through this adjustment component, the voltage on the second connection of the pump capacitors is changed, for instance, by means of an additional direct component or also based on its ratio between on- and off-time in accordance with a pulse code modulation.

The alternating signal comprises sine-shaped components and especially has a rectangular progression over time; however, it can also have any other suitable progression over time.

According to a preferred upgrade of the present invention, a blocking diode is installed respectively between each pump capacitor and the high voltage generator in a way that its anode is connected to the high voltage generator and that the cathode can be connected to the first and second input connections. In addition, the blocking diodes respectively form a low-pass filter with the pump capacitors so that the requirement for the ripple of the output voltage and hence also the clock frequency of the high voltage generator as well as the power consumption can be further reduced. However, appropriately connected transistors can also be used.

To enable a particularly accurate control during use of the circuit according to the invention in a configuration with a closed control loop, the control unit is equipped with an input for an externally or internally supplied clock.

When the capacitance of the pump capacitors is chosen in a way that it is substantially higher than the capacitance of the electrostatic excitation unit, the overall electrostatic force depends on the high voltage and the alternating signal as indicated in equation (5).

The present invention can be used in a particularly advantageous way for a coriolis angular rate sensor with a primary oscillator element that can be electrostatically excited and a secondary oscillator element that can be electrostatically excited. Thereby, the coriolis angular rate sensor can have a circuit that corresponds to the one of the invention to control the primary and/or to reset the secondary oscillator element.

Figure 1A:
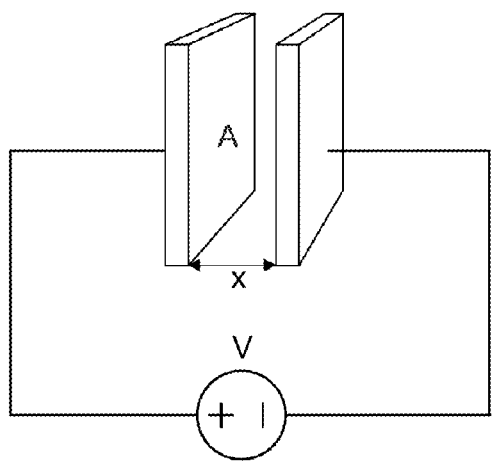
FIG. 1a is a schematic diagram of a capacitive electrostatic force generation by means of parallel electrodes.
Figure 1B:
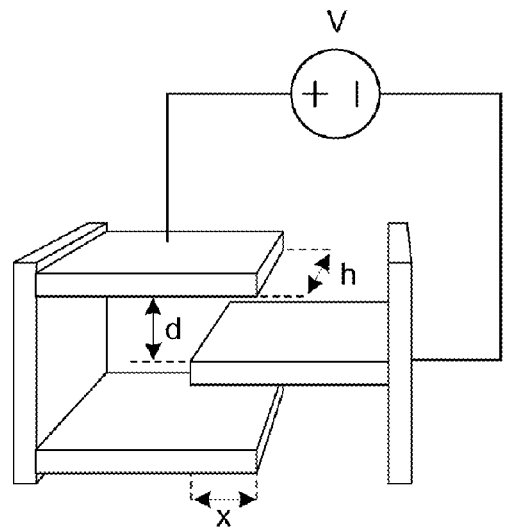
FIG. 1b is a schematic diagram of a capacitive electrostatic force generation by means of comb actuators.
Figure 2:
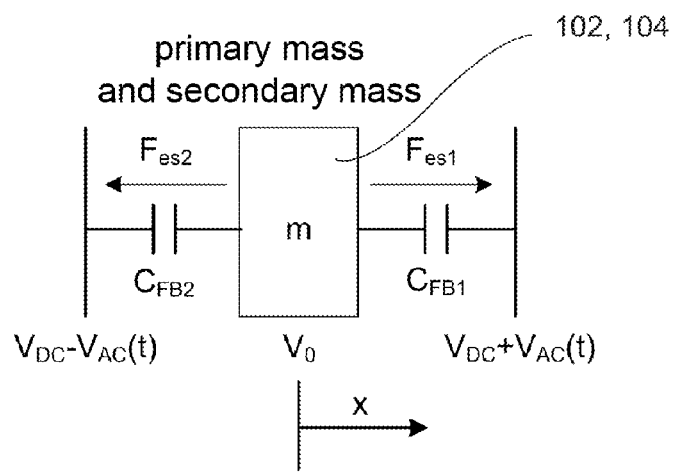
FIG. 2 is a schematic diagram of the differential capacitive electrostatic actuation of a mass m.
Figure 3:
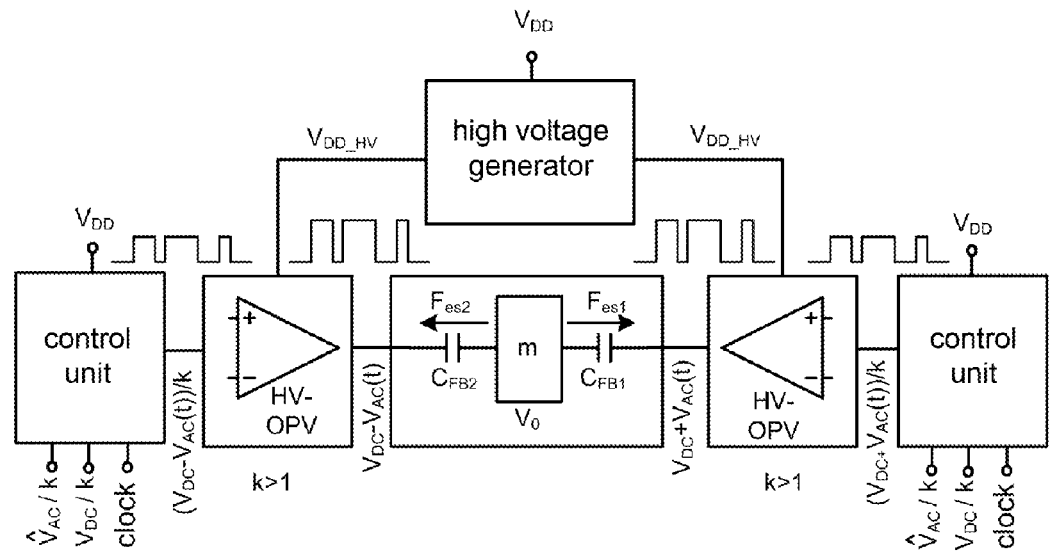
FIG. 3 is a schematic diagram of a known circuit to activate capacitive actuators by means of high voltage operation amplifiers.
Figure 4:
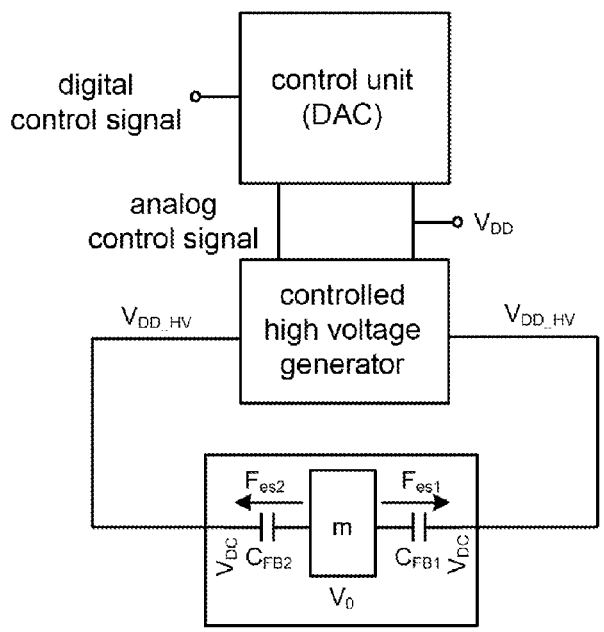
FIG. 4 is a schematic diagram of a known circuit to activate capacitive actuators by means of a controlled high voltage generator that is directly connected to the actuator.

A control loop to activate the primary oscillator element that can be electrostatically excited comprises, for example, a phase-locked control loop (phase locked loop, PLL) as explained in the above-mentioned article by Northemann, T. et al., especially with reference to the respective FIG. 1. Accordingly (or alternatively), the control loop to reset the secondary oscillator element that can be electrostatically excited can also have a circuit according to the present invention and further comprise a band-pass filter (or a low-pass filter) and a lead-capacitor. However, the lead-capacitor can also be part of the filter.

The coriolis angular rate sensor can be manufactured as a particularly space-saving, interference-free and efficient integrated microsystem, whereby the oscillator elements are designed as mechanically produced components that are integrated with at least one part of the circuit elements for activation and assessment.

In addition, the present invention relates to a method to activate a capacitive MEMS structure with at least one oscillator element, that can be excited for an oscillating movement, and an electrostatic excitement unit that comprises, for example, at least a first and a second coupled capacitance, whereby the process is made up of the following steps:

Charging of respectively one positive electrode of a first and a second pump capacitor and a positive electrode of the electrostatic excitation unit, e.g. the two coupled capacitances, by means of a high voltage generator;

Applying an alternating voltage to the negative electrode of the first pump capacitor and applying a second alternating voltage, that is inverse to the first alternating voltage, to the negative electrode of the second pump capacitor;

Superposing the first and second alternating voltage with an interphase voltage that depends on a real value of the actual position of the oscillator element or another adjustment variable.

In particular, the two coupled capacitances can be coupled differentially.

In a preferred way, the interphase voltage is provided by a low voltage operation amplifier. There will be a charge exchange in the steady operating mode between the first pump capacitor and the first differentially coupled capacitance as well as between the second pump capacitor and the second differentially coupled capacitance through the control mechanism of a control unit.

Separate measurement electrodes can be used to generate a real value signal for the real value of the actual position of the oscillator element, whereby the accuracy of the measurement process can be improved.

Due to the strongly growing demand for inertial sensors in the field of mobile inertial sensor technology, the advantages of the invention with regard to reduced power consumption are quite significant.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A circuit for activating a capacitive MEMS structure with an oscillator element and an electrostatic excitation unit having a first input connection and a second input connection, the circuit comprising:
   a high voltage generator generating a high voltage and connecting to the first input connection and the second input connection;
   a first pump capacitor having (a) a first connection connected to the first input connection of the high voltage generator, and (b) a second input connection;
   a second pump capacitor having (a) a first connection connected to the second input connection of the high voltage generator, and (b) a second input connection;
   a control unit connected to the second input connection of the first pump capacitor and the second input connection of the second pump capacitor; and
   a low voltage operation amplifier connected to the control unit.

2. The circuit according to claim 1, further comprising a blocking diode between the first pump capacitor and the second pump capacitor and the high voltage generator such that its anode is connected to the high voltage generator and its cathode is connected to the first input connection of the high voltage generator and the second input connection of the high voltage generator.

3. The circuit according to claim 1, wherein the control unit includes a triggered clock input.

4. The circuit according to claim 1, wherein the low voltage operation amplifier has an adjustable feedback factor k.

5. The circuit according to claim 1, wherein the capacitance of the first pump capacitor and the capacitance of the second pump capacitor is substantially higher than the capacitance of the electrostatic excitation unit.

6. A coriolis angular rate sensor, comprising:
   a primary oscillator element;
   a second oscillator element;
   an electrostatic excitation unit having a first input connection and a second input connection; and
   a circuit activating the primary oscillator element or resetting the secondary oscillator element, and having:
   (a) a high voltage generator generating a high voltage and connecting to first input connection and the second input connection;
   (b) a first pump capacitor having (1) a first connection connected to the first input connection, of the high voltage generator, and (2) a second input connection;
   (c) a second pump capacitor having (1) a first connection connected to the second input connection the high voltage generator, and (2) a second input connection;
   (d) a control unit connected to the second connection of the first pump capacitor and the second connection of the second pump capacitor; and
   (e) a low voltage operation amplifier connected to the control unit.

7. The coriolis angular rate sensor according to claim 6, further comprising a control loop having a phase-locked control loop to activate the primary oscillator element.

8. The coriolis angular rate sensor according to claim 6, further comprising a control loop, a band-pass filter or low-pass filter, and a lead capacitor to reset the secondary oscillator element.

9. A method of activating a capacitive MEMS structure with an oscillator element and an electrostatic excitation unit, comprising the following steps:
   charging a positive electrode of respectively a first pump capacitor and a second pump capacitor;
   charging a positive electrode of the electrostatic excitation unit using a high voltage generator;
   applying a first alternating voltage to a negative electrode of the first pump capacitor;
   applying a second alternating voltage to the negative electrode of the second pump capacitor that is inverse to the first alternating voltage; and
   superposing the first and second alternating voltage with an interphase voltage that depends on a real value of the actual position of the oscillator element or another adjustment variable.

10. The method according to claim 9, wherein the interphase voltage is supplied by a low voltage operation amplifier.

11. The method according to claim 9, wherein separate measurement electrodes are used to generate a real value signal for the real value of the actual position of the oscillator element.

* * * * *